Figure 1:
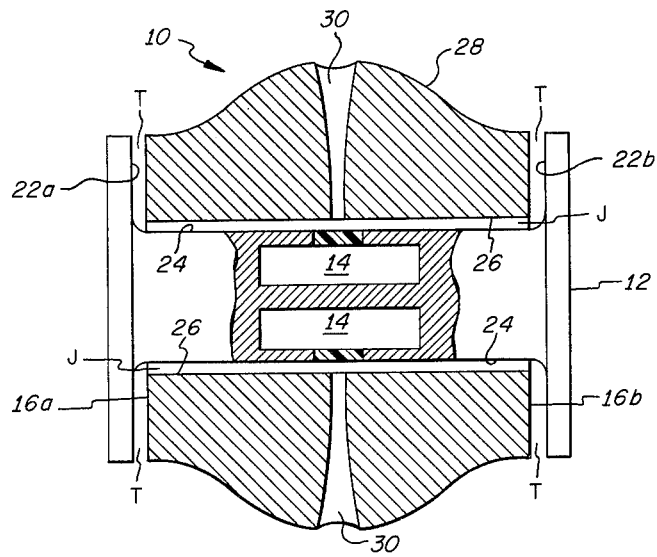

Jan. 11, 1966 P. J. BIZZIGOTTI 3,228,734
GAS BEARINGS

Filed Sept. 24, 1962 2 Sheets-Sheet 1

INVENTOR.
Pio J. Bizzigotti
BY
ATTORNEY

Jan. 11, 1966   P. J. BIZZIGOTTI   3,228,734
GAS BEARINGS

Filed Sept. 24, 1962                           2 Sheets-Sheet 2

INVENTOR.
PIO J. BIZZIGOTTI
BY
S.C.Yeaton
ATTORNEY 3,228,734
GAS BEARINGS
Pio J. Bizzigotti, Huntington Station, N.Y., assignor to Sperry Rand Corporation, Great Neck, N.Y., a corporation of Delaware
Filed Sept. 24, 1962, Ser. No. 225,564
2 Claims. (Cl. 308—9)

This invention relates in general to bearings and in particular to bearings which are of a type that utilizes a lubricating gas under pressure, such pressure being created both hydrostatically and hydrodynamically.

Bearings utilizing lubricating gases under hydrostatic pressure, e.g. the bearing shown in U.S. Patent 2,695,199, issued in the name of R. B. Blizard and assigned to the present assignee, keep respective surfaces apart through the use of compressors or the like which force gas between bearing parts for minimum friction therebetween. A bearing utilizing lubricating gas under hydrodynamic pressure, e.g. the bearing shown in U.S. Patent 2,899,243, issued August 11, 1959, on the other hand keeps its surfaces apart by causing a thin film of gas under pressure to be produced between its moving parts which prevents physical contact of those parts. The use of lubricating gas simultaneously under both hydrostatic and hydrodynamic pressures is admittedly known, being employed in one way by the bearing shown in U.S. Patent 2,884,282 and in an improved way by bearings embodying the invention.

In one form of the invention, a thrust bearing provides axial support of a rotatable member by use of hydrostatic and hydrodynamic gas pressures, both of which are produced by the bearing itself. The hydrodynamic gas pressure is produced in the manner taught in the aforementioned U.S. Patent 2,899,243, i.e. a face on the axially supported rotatable member which is juxtaposed a thrust plate has depressions therein which dynamically create pressure between the members; hydrostatic pressure, however, is provided by forcing gas through channels in the rotatable member, such channels emanating on the bearing member face having the depression therein. The gas is scooped into and forced through the channels when the rotatable member rotates. Whereas prior art bearings require, as aforementioned, compressors etc. for static pressure, bearings embodying the invention provide static pressure by virtue of their own operation.

A journal bearing embodying the invention similarly has channels extending to its inner face (which forms the side of a bearing central aperture adapted to contain a supporting shaft) into which gas is scooped as the bearing rotates on its supporting shaft, thereby producing static pressure to assist the dynamic pressure normally produced by wedging a gas film between the bearing inner face and the supporting shaft.

The aforementioned Patent 2,884,282 describes a particular advantage gained by combining static and dynamic pressures to lubricate journal bearings, i.e. the tendency to whirl (which is described later) is minimized by use of static pressure. The present invention improves on this teaching by nonlinearly minimizing the tendency to whirl as a direct function of the speed of rotation of the bearing, the tendency to whirl (in the absence of static pressure) occurring more easily as the rotational speed of the bearing increases. This will be described fully late.

A principal object of the invention is to provide a bearing that is lubricated by gas under both hydrodynamic and hydrostatic pressures.

Another object of the invention is to provide a thrust bearing which is gas lubricated, such gas being under hydrostatic and hydrodynamic pressures.

Another object of the invention is to provide a gas lubricated journal bearing having practically no tendency to whirl.

Another object of the invention is to provide a gas lubricated journal bearing utilizing gas under hydrodynamic and hydrostatic pressure.

Figure 2:
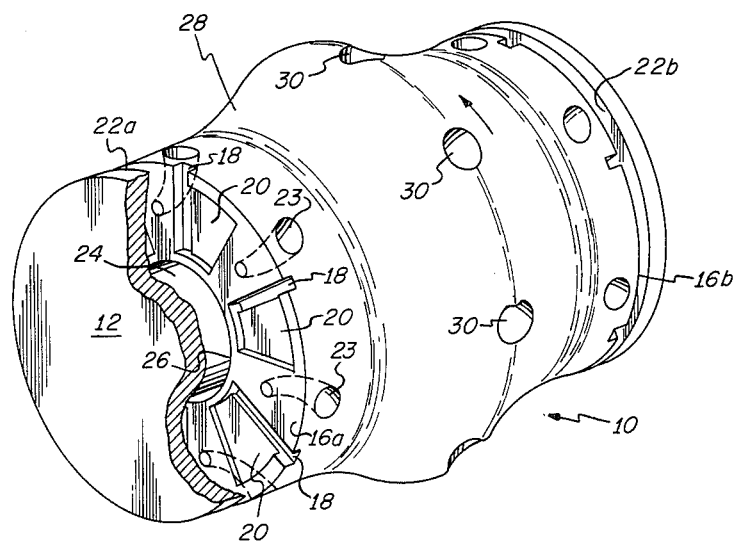
Figure 3A:
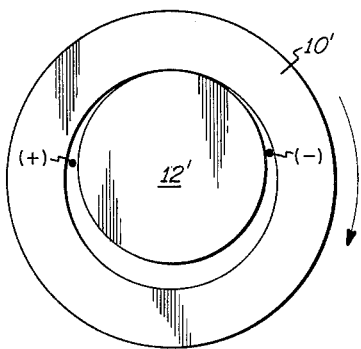
Figure 3B:
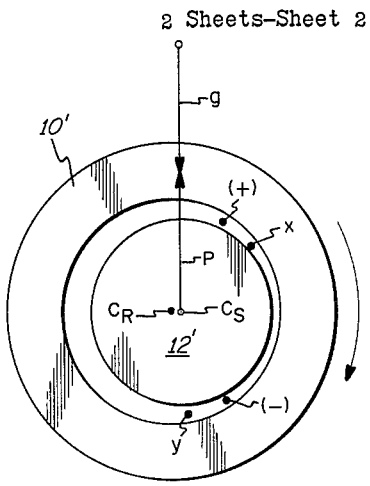
Figure 4:
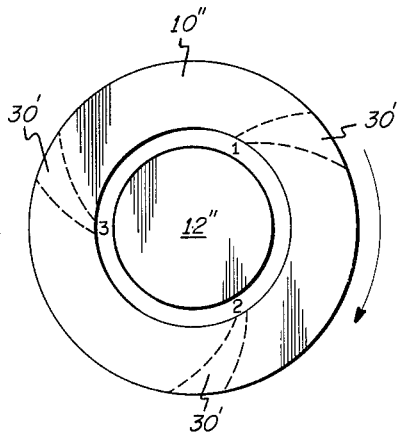
Figures 5A, 5B:
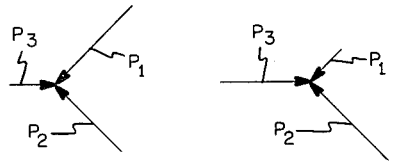
Figure 6A:
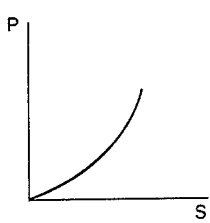
Figure 6B:
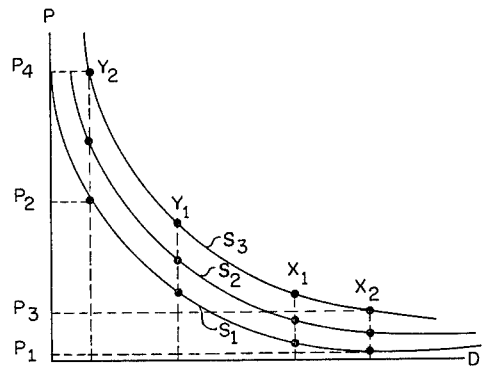

The invention will be described with reference to the figures wherein:

FIG. 1 shows a cross sectional view of a gyro rotor utilizing two forms of the present invention, FIG. 2 shows a perspective view in partial cutaway of the gyro rotor of FIG. 1, FIGS. 3a and 3b are diagrams useful in describing how "whirl" occurs in journal bearings, FIG. 4 is an end view of a journal bearing embodying the invention, FIGS. 5a and 5b are diagrams useful in describing how "whirl" in a gas lubricated journal bearing is prevented by gas under static pressure, and FIGS. 6a and 6b are diagrams useful in describing the nonlinear ability of apparatus employing the invention to minimize the tendency of a bearing to whirl.

Referring to FIG. 1, a gyro rotor employing two forms of the invention has a rotor 10 rotatably mounted on a shaft member 12, the shaft member 12 being adapted to have an electric winding laid in a space 14 to drive the rotor 10. The rotor 10 constitutes a journal bearing loosely interfitting with the shaft member 12 (with a tolerance designated J) for easy rotation thereof. Thrust bearings for the rotor 10 to prevent its sidewise movement are on the rotor faces 16a and 16b and form close tolerances (designated T) with the shaft member faces 22a and 22b respectively. The apparatus of FIG. 1 is adapted to be secured within a gimbal for use in gyroscope apparatus.

Referring to FIG. 2, the nature of the thrust bearing design may be appreciated. The face 16a of the rotor is provided with a plurality of channels 18 through which gas may flow to enter depressions 20 in the face 16a. The faces 22a and 22b are smooth, as are the faces 24 and 26 of the shaft member 12 and the rotor 10 respectively. The thrust bearing comprising faces 16b and 22b is identical to the bearing comprising faces 16a and 22a. Channels 23, shown in FIG. 2, extend from the outer face 28 of the rotor 10 to the faces 16a and 16b thereof, each such channel being preferably conical in shape (the wider part being on the face 28) and emanating on an undepressed portion of either the face 16a or the face 16b. Other channels 30, also preferably conical in shape, extend from the rotor face 28 through to its inner face 26.

As the rotor 10 rotates on the shaft member 12, gas in the channels 18 is smeared across the depressions 20 causing, as is known, substantial gas pressure to occur wherever the depressions 20 meet undepressed portions of the faces 16a and 16b. In addition, rotation of the rotor 10 causes gas to be scooped into the channels 23 and squirted out and against the shaft member faces 22a and 22b, thereby further increasing such pressure. As a result, the rotor 10 is pushed axially away from both shaft member faces 22a and 22b.

As the rotor is rotated, a wedge of gas apppears between the faces 26 and 24 of the rotor 10 and shaft member 12 respectively. This wedge of gas, as is known, creates a gas pressure differential which causes the rotor 10 to be lifted away from the shaft member 12. Rotation of the rotor 10 in addition causes the channels 30 to scoop up gas and squirt it against the shaft face 24, thereby assisting the pressure differential created by the aforementioned wedge.

FIGS. 3a and 3b show how a gas journal bearing operates. Referring to FIG. 3a, a shaft 12' loosely fits within a rotor 10'. As the rotor rotates, gas is viscously sheared and forced into the wedge-like space between the rotor 10' and the shaft 12', thereby causing a positive pressure to appear at (+) and a negative pressure to appear at (−). This pressure differential then gradually works the rotor 10' round to assume the position shown in FIG. 3b, causing the rotor 10' to overcome the force of gravity g and lift away from the shaft 12'. As the rotor 10' increases in speed, the positive pressure P causes rotor 10' to be lifted even more, thereby shifting the positions of both the positive and negative pressures to the points designated X and Y respectively. As a result, the rotor 10' center (which is designated $C_R$) starts to whirl about the shaft center (which is designaed $C_S$). Such whirling is undesirable because it permits ready slamming of the rotor against the shaft.

U.S. Patent 2,884,282 describes how the tendency to whirl may be minimized by applying gas under static pressure between a rotor and its supporting shaft. Generally, gas under static pressure operates to hinder whirl as follows: As the rotor starts to leave its neutral position, the pressure appearing on the forward face of the shaft in the direction of movement increase (whereas the pressure appearing on the aft face decreases) thereby tending to force the rotor to reassume its neutral position.

Referring to FIG. 4, a shaft 12'' supports a rotor 10'' modified in accordance with the invention, such rotor applying static pressure at different points around the shaft 12'' circumference. For simplicity of understanding only three channels 30' are employed by the rotor of FIG. 4, each such channel 30' being positioned 120° away from the others. As taught by Patent 2,884,282, static gas pressures $P_1$ and $P_2$ (i.e. the pressures produced by means of the channels 30') at points 1 and 2 will be larger than the static pressure $P_3$ at a point 3 because the shaft 12'' is in closer proximity to the rotor 10'' at points 1 and 2 than at the point 3. See FIG. 5a. As the rotor starts to whirl the pressure at the point 2 increases as does the pressure at the point 3; however, the pressure at the point 1 falls off. See FIG. 5b. As a result, the rotor 10'' tends to reassume its previous position and not whirl.

Because the static pressure applied with the apparatus of U.S. Patent 2,884,282 is from a constant pressure source, the ability to prevent whirl disappears at a certain rotor speed of rotation for a given orientation of the rotor axis, i.e. as the rotor axis assumes a vertical the rotor speed at which "whirl" occurs decreases. By means of the present invention, the ability to prevent whirl is enhanced exponentially as the rotor speed of rotation increases, thereby overcoming the attendant disadvantage of the prior art whirl prevention technique. Referring to FIG. 6a, the rotor speed vs. pressure curve, i.e. the S v. P curve, shows that static pressure increases nonlinearly as the speed of rotation of a rotor embodying the invention increases. Pressure vs. deplacement (between the rotor 10'' and shaft 12'') curves in FIG. 6b show that the static pressure at a given point falls off nonlinearly as the distance between the rotor and the shaft at that point increases, such curves indicating further that as the rotor speed of rotation is incrementally increased from $S_1$ to $S_2$ to $S_3$, etc., the range of available static pressures is also increased.

Should the shaft be displaced from the rotor at one point by a distance $X_1$, and then increase to a distance $X_2$, the displacement between the rotor and shaft members on the reverse side of the shaft will decrease from $Y_1$ to $Y_2$.

For a speed of $S_1$ the whirl-hindering pressure differential will be the difference between $P_1$ and $P_2$; for a speed of $S_3$, that same displacement will produce a pressure differential equal to the difference between $P_3$ and $P_4$, a considerably more effective pressure differential to hinder whirl. Whereas the tendency to whirl increases directly as a function of speed of rotor rotation, apparatus embodying the invention operates in an exponential manner to hinder such tendency.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A gas lubricated thrust bearing comprising a first member having a substantially flat face and a second member rotatable about an axis perpendicular to both said flat first member face and a face on said second member, means for supporting said first and second members to allow a film of gas to reside between said faces, said second member face having a plurality of recesses therein into which gas may flow to produce hydrodynamic pressure between said members when said second member rotates, said second member being provided further with a plurality of bored channels interconnecting a face thereof which is parallel to said second member axis of rotation to the second member face adjacent said first member face, whereby gas introduced into the channels exerts hydrostatic pressure between the first and second members when said second member rotates.

2. Gas lubricated gyroscope apparatus comprising a shaft, a rotor having a central aperture through which said shaft extends forming such a loose fit therewith that a film of gas may reside between said shaft and rotor, first and second flat plates, said first plate being at one end of said shaft and the other plate being at the other end of said shaft, said flat plates being larger in area than the central aperture in said rotor, said rotor having depressions in its faces adjacent said flat plates and first and second pluralities of bored orifices thereon, said first plurality of orifices extending from peripheral parts of said rotor to parts of said rotor faces, and said second plurality of orifices extending radially from peripheral parts of said rotor to the inside of said central aperture, whereby hydrostatic and hydrodynamic pressures may prevent the rotor from being contiguous with any of the other parts of said apparatus.

References Cited by the Examiner

UNITED STATES PATENTS

| 1,443,990 | 2/1923 | Harden | 308—117 |
| 3,027,471 | 3/1962 | Burgwin et al. | 310—74 |
| 3,048,043 | 8/1962 | Slater | 74—5 |

FOREIGN PATENTS

| 181,468 | 3/1955 | Austria. |
| 887,695 | 1/1962 | Great Britain. |

DON A. WAITE, *Primary Examiner.*

FRANK SUSKO, *Examiner.*